US010091187B2

(12) United States Patent
Bronshtein et al.

(10) Patent No.: US 10,091,187 B2
(45) Date of Patent: *Oct. 2, 2018

(54) BYPASSING CERTIFICATE PINNING

(71) Applicant: International Business Machines Corporation, Armonk, NY (US)

(72) Inventors: Emanuel Bronshtein, Ashdod (IL); Roee Hay, Haifa (IL); Sagi Kedmi, Raanana (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,130

(22) Filed: Sep. 26, 2017

(65) Prior Publication Data

US 2018/0013754 A1    Jan. 11, 2018

Related U.S. Application Data

(63) Continuation of application No. 15/384,738, filed on Dec. 20, 2016, now Pat. No. 9,774,590, which is a continuation of application No. 15/138,876, filed on Apr. 26, 2016.

(51) Int. Cl.
*H04L 29/06* (2006.01)

(52) U.S. Cl.
CPC ...... *H04L 63/0823* (2013.01); *H04L 63/0281* (2013.01)

(58) Field of Classification Search
CPC . H04L 63/0281; H04L 63/0823; H04L 9/006; H04L 9/3263; H04L 29/06551
See application file for complete search history.

(56) References Cited

U.S. PATENT DOCUMENTS

| 8,112,787 | B2 | 2/2012 | Buer |
| 8,850,185 | B1 | 9/2014 | Vaughn |
| 2012/0272058 | A1 | 10/2012 | Wang et al. |

(Continued)

OTHER PUBLICATIONS

Bates et al., "Securing SSL Certificate Verification through Dynamic Linking," CCS'14: Proceedings of the 2014 ACM SIGSAC Conference on Computer and Communications Security, 2014, 12 pages. DOI: 10..1145/2660267.2660338.

(Continued)

*Primary Examiner* — Jeffrey Pwu
*Assistant Examiner* — Thong Truong
(74) *Attorney, Agent, or Firm* — Christopher M. Coy

(57) ABSTRACT

A client application performs certificate pinning as a means of authenticating the identity of a server. A proxy is interposed in the communications path of the client and the hosting server and provides a proxy security certificate to the client. In response to the client extracting a proxy authentication component from the proxy security certificate, operation of the client is paused and a hosting server authentication component is extracted from a hosting server security certificate. The client operation is resumed, providing the extracted hosting server authentication component to the client, in substitution for the proxy authentication component. Based on receiving the extracted hosting server authentication component, the client authenticates the proxy to receive communications directed to the hosting server.

1 Claim, 6 Drawing Sheets

(56) References Cited

U.S. PATENT DOCUMENTS

2015/0067830 A1* 3/2015 Johansson ........... H04L 63/1408
726/22

OTHER PUBLICATIONS de la Hoz et al., "Detecting and Defeating Advanced Man-in-the-Middle Attacks Against TLS," 2014 6th International Conference on Cyber Conflict (CyCib 2014), 2014, pp. 209-221. DOI: 10.1109/CYCON.2014.6916404.

Dierks et al., "The Transport Layer Security (TLS) Protocol Version 1.2", RFC 5246, Aug. 2008, 104 pages, Printed Nov. 17, 2015, http://tools.ietf.org/html/rfc5246#page-33.

Osborne et al., "When Security Gets in the Way: PenTesting Mobile Apps That Use Certificate Pinning," Presentation from blackhat USA 2012, Jul. 2012, 38 pages. https://media.blackhat.com/bh-us-12/Turbo/Diquet/BH_US_12_Diqut_Osborne_Mobile_Certificate_Pinning_Slides.pdf.

Mayer, D., "Bypassing OpenSSL Certificate Pinning in iOS Apps", NCC Group Blog, Jan. 6, 2015, 19 pages, Printed Nov. 17, 2015. https://www.nccgroup.trust/us/about-us/newsroom-and-events/blog/2015/january/bypassing-openssl-certificate-pinning-in-ios-apps/.

Walton et al., "Certificate and Public Key Pinning", OWASP, Printed Nov. 17, 2015, 13 pages. https://www.owasp.org/index.php/Certificate_and_Public_Key_Pinning.

Unknown, "Introduction to SSL", Archive of obsolete content, Mozilla Developer Network, . Last updated Sep. 26, 2005, Printed Nov. 17, 2015, 14 pages. https://developer.mozilla.org/en-US/docs/Archive/Security/Introduction_to_SSL#Server_Authentication.

Unknown, "iOS Application Security Part 36—Bypassing Certificate Pinning Using SSL Kill Switch", INFOSEC Institute, Printed Nov. 17, 2015, 8 pages. http://resources.infosecinstitute.com/ios-application-security-part-36-bypassing-certificate-pinning-using-ssl-kill-switch/.

"Self-signed certificate", Wikipedia, the free encyclopedia, Printed Nov. 17, 2015, 2 pages. https://en.wikipedia.org/wiki/Self-signed_certificate.

Bronshtein et al., "Bypass Certificate Pinning," U.S. Appl. No. 15/138,876, filed Apr. 26, 2016.

Bronshtein et al., "Bypass Certificate Pinning," U.S. Appl. No. 15/384,738, filed Dec. 20, 2016.

Bronshtein et al., "Bypass Certificate Pinning," U.S. Appl. No. 15/716,071, filed Sep. 26, 2017.

Accelerated Examination Support Document, U.S. Appl. No. 15/384,738, signed Dec. 19, 2016, 15 pgs.

Accelerated Examination Support Document, U.S. Appl. No. 15/716,071, filed Sep. 20, 2017, 15 pgs.

List of IBM Patents or Patent Applications Treated as Related, signed Sep. 20, 2017, 2 pages.

Andzakovic, D., "Bypassing SSL Pinning on Android via Reverse Engineering," Whitepaper, May 15, 2014, 12 pages, Security-Assessment.com.

* cited by examiner

BYPASSING CERTIFICATE PINNING

BACKGROUND

The present disclosure relates to methods for authenticating a computer server. More specifically, the present disclosure relates to a method to bypass certificate pinning in systems that perform certificate pinning to authenticate a server.

SUMMARY

In an embodiment of the present disclosure, a method for authenticating a hosting server features a proxy interposed in the communication path between a client and the hosting server. The client and the proxy each operate in a computing device. The method includes receiving a request for a security certificate from the client and, in response, communicating a security certificate associated with the proxy to the client. A feature of the method detects the client extracting a proxy server authentication component from the proxy server security certificate. Detecting the client extracting the proxy server authentication component pauses operation of the client.

The method further features extracting a hosting server authentication component from a server security certificate associated with the hosting server. The client operation is resumed, and resuming the client operation includes providing to the client the extracted hosting server authentication component in substitution for the proxy server authentication component. Based on receiving the extracted hosting server authentication certificate, the client authenticates the proxy to receive client communications directed to the hosting server.

In another feature of the method, an extraction function operates to extract the proxy server authentication component from the proxy server security certificate. Instrumenting the extraction function operates to detect the client extracting the proxy server authentication component from the proxy server security certificate.

An aspect of the disclosure includes the proxy receiving a client communication directed to the hosting server. The proxy receiving the client communication is based at least in part on the client authenticating the proxy to receive client communications directed to the hosting server using the extracted hosting authentication component. In another aspect of the disclosure, the client performs certificate pinning authentication of the hosting server. Providing the hosting server authentication component to the client, in substitution for the proxy server authentication component, satisfies the certificate pinning authentication.

It is another feature of the disclosure that a computer program product includes instructions executable by a computing device to perform the method. It is yet another feature of the disclosure that a computing system can embody structures configured to perform aspects of the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
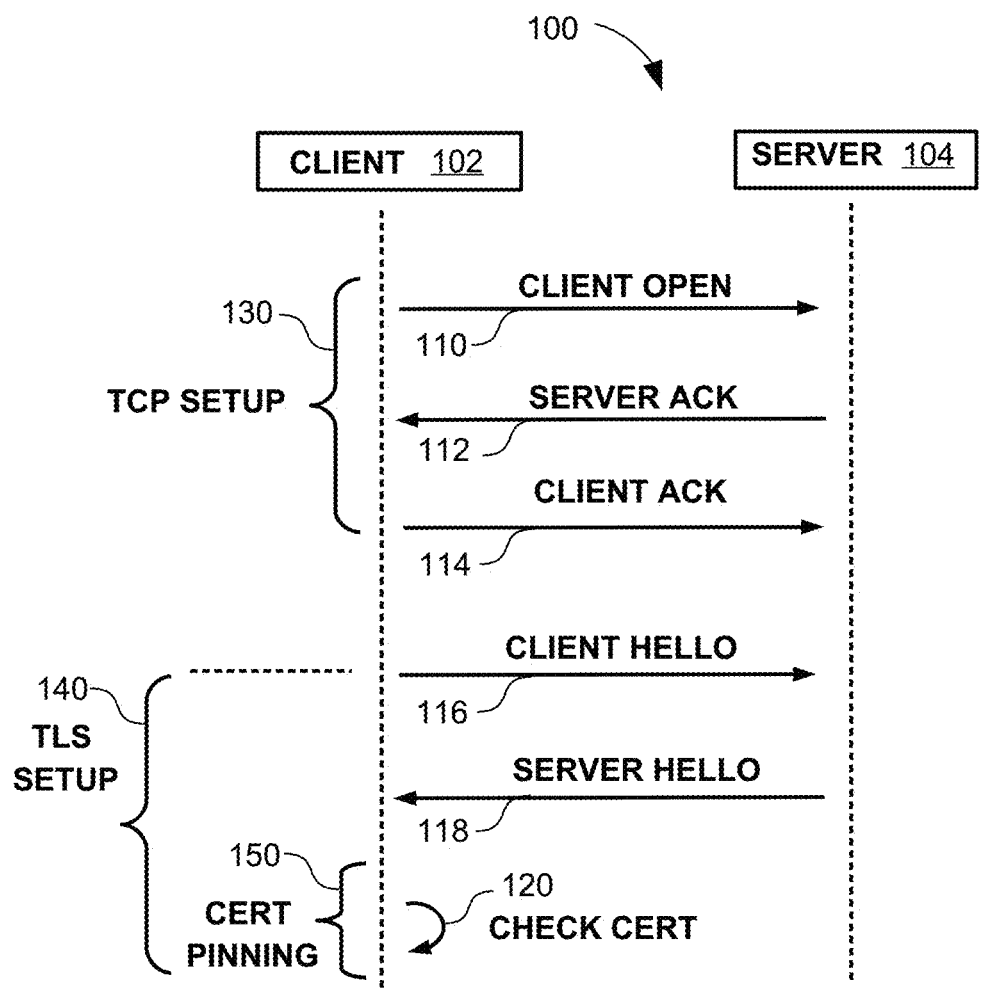
FIG. 1 is a flow diagram illustrating an example of a client and server establishing secure communications, according to aspects of the disclosure

While the invention is amenable to various modifications and alternative forms, specifics thereof are shown by way of example in the drawings and are described, herein, in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computing applications that authenticate the identity of a server hosting resources or services accessed by the client. More particular aspects of the disclosure relate to bypassing certificate pinning verification of security certificates. While the present disclosure is not necessarily limited to such applications, various aspects of the disclosure may be appreciated through a discussion of various examples using this context.

Applications (hereinafter, "clients") executing on, or within, a computer or computing device may access resources or services in other computers or computer systems (hereinafter, "server"). "Computer", and "client computer", as used in the disclosure in the context of an embodiment of a client application, refer to any of a variety of computing or electronic devices, including a virtual machine (VM) of a computer or computing device, of which a client application may be a component, or on/in which a client application may execute, and as are particularly disclosed in the present specification. "Server", as used in the disclosure in the context of a client application accessing a resource or service, refers to a computer or computing system that hosts resources or services accessed by the client application. In other contexts, "computer" and "server" are understood to have their common meaning with regard to general purpose computing devices in various other computing system roles.

Clients may be, or include, programs operating on a computer, or within a virtual machine of a computer. Clients may be, or include, "apps", such as those used on a mobile device (e.g., a cell phone or tablet computer). Clients may be, or include, programs and/or hardware components, for example, of a device included in a household appliance, such as a network-connected monitoring or control device of a refrigerator, or personal device (e.g., a fitness monitor). A client may include, or may be embodied, in whole or in part, in a hardware component of a computer or computing device.

Clients may access resources or services by means of a communications network that connects a client to a server. A communications network may be, or include, for example, a corporate (or home) intranet (e.g., a LAN or WAN), the Internet, or a cellular communications network (e.g., mobile phone networks). Alternatively, a client may have some form of direct connection to a server, such as an I/O interface cable. Clients may access a server, for example, to request data, such as a web page; a service, such as a banking transaction; or a resource, such as storage or a virtual machine in a computer server or a computing cloud.

In some cases, a client may communicate information to a server in which some, or all, of the client information may be confidential or sensitive. A client may need, therefore, to assure that the server is "trusted". A server may be trusted in the sense that the server is authorized to receive or utilize client information. For example, a client may trust a server not to expose client information to other applications or computers. A server may be trusted in the sense that the client may be confident that the server will not return information (or, data) to the client that might compromise the operations of the client, the client computer, or a computer or server that the client, or the client computer, may communicate with. For example, a client may trust a server not to inadvertently, or maliciously, transmit or install malware in the client or the computing environment (e.g., the client computer, or VM of a client computer) in which the client operates.

As part of accessing resources or services of a trusted server, a client, or a client computer, may authenticate the identity of a server communicating with the client to assure the server is actually the intended server. A particular type of security threat is a "Man in the Middle (MiTM)" attack. To effect a MiTM attack, an attacker is inserted in the communications path (or, "communications channel") between a client and a server. An attacker may perform any of a variety of methods to accomplish such insertion. The result of such insertion is that the attacker may then intercept communications between the client and an intended server. The attacker may simply monitor the communications, for example to "snoop" the client information, or may communicate the information to an unauthorized user (e.g., to extract a credit card number for unauthorized use by another). An attacker may modify information in the communications, for example, to expose the client to malware that then may be installed on the client computer.

Prior to exchanging confidential or sensitive information with a server, a client may authenticate the identity of a server as a trusted server. Having authenticated a server as trusted, a client may establish a secure communications "session" with the server, such that an attacker cannot monitor communications between the client and the server. For example, a client and server may establish a secure session to encrypt their communications, such that an attacker cannot monitor or modify their communications. A client and server may use, for example, Transport Layer Security (TLS) to mutually select a particular method of encrypting client-server communications. To establish a secure session using TLS, for example, a client may communicate a set of cryptographic information (e.g., a random number and a suite of ciphers) to use for encrypting client-server communications. Correspondingly, the server may return a set of cryptographic information (e.g., a random number and a particular cipher of those the client sent) to use for encrypting client-server communications.

Prior to, or as part of, establishing a secure session, a client may authenticate the server as the actual, trusted server. A client may use a securely signed digital identity (or, "security") certificate, associated with the server, to verify the authenticity of the server providing that certificate. As part of establishing a secure session (e.g., using TLS) with a server, a client may request that the server provide the security certificate to the client. The client may use the security certificate received from the server to verify the authenticity of the server. The certificate may include authentication component information about the server, such as a public encryption key used by the Certificate Authority (CA).

If the certificate is valid, the client may then complete establishing the secure session (e.g., begin to exchange encrypted client information with the server). If the certificate is not valid (e.g., the Certificate Authority that signed the certificate is not a trusted CA, the digital signature of the CA is not valid, or the public key of the server, included in the certificate, does not match a value the client expects), the client may terminate communications with the server.

FIG. 1 illustrates an example client and server flow 100 to establish a secure (e.g., TLS) session to communicate with a server using, for example, a common Internet protocol such as Transmission Control Protocol (TCP). TCP setup 130 establishes the TCP session. As part of TCP setup 130 client 102 sends a client open request (110) to server 104. Server 104 responds with a server acknowledgement (112), and the client completes TCP setup 130 by sending the server a client acknowledgement (114).

The TCP session itself may simply open a communications channel for transmitting messages between the client and the server. The TCP session may not otherwise be secure against a third party device or program eavesdropping upon, or intercepting and modifying, client and server messages. Accordingly, the client and server may perform TLS setup 140 to establish a secure communications session. Client 102 may send a "client hello" message (116) to initiate TLS setup 140. The client hello message may include cryptographic information to negotiate with the server, for example, a secure cipher for encrypting subsequent communications with the server. Server 104 may then respond by sending a "server hello" message (118), and the server hello message may include cryptographic information to complete negotiating the cipher.

A client may incorporate authentication of the server identity in the process to establish a secure session, such as in establishing TLS setup 140. To authenticate the server as a trusted server, a client may request that the server return a security certificate. For example, a client may include a request for a security certificate in a client hello. The server may return the security certificate, for example in a server hello. For example, the client hello sent as part of TLS setup 140 may include a request for server 104 to provide a security certificate associated with the server. Server 104 may return the certificate in the server hello sent to the client.

The information in the security certificate may include one or more authentication components that client 102 may use to verify the authenticity of server 104. For example, a certificate may include the public encryption key of the server. The client may utilize an extraction function to extract particular authentication component information, such as a public key, from a server certificate. An extraction function may be a function of a component (e.g., a utility of an operating system or other program) on, or in communication with, the client computer. The client may access the extraction function by an interface, such as an API or a hardware interface.

To authenticate a server security certificate, a client may perform "certificate pinning". In performing certificate pinning, a client may extract particular information from a security certificate. The client may compare the information from the security certificate, or a derivative of the information, to information, or an equivalent derivative thereof, stored securely within or by the client. For example, a client may have (or "know") a trusted "pin" associated with a trusted security certificate, or derived from information included in a trusted security certificate. A client may derive a trusted pin for a previously trusted server certificate, for example, as a hash of the public key of the server. A client may store the pin in a secure location; for example, a client may embed the pin within a client code module (e.g., a binary executable or data module). Upon receiving a security certificate, a client may form a pin from an authentication component included in a security certificate and compare that pin to the trusted pin the client has stored (or knows).

For example, FIG. 1 illustrates client 102 performing certificate pinning 150. In performing the certificate pinning, client 102 may extract the public key of server 104 from a security certificate received from server 104 (e.g., in the server hello). Client 102 may have formed a pin by means of a hash of the public key of server 104 and may have embedded the pin in a binary executable or date file of client 102. Client 102 may then form a hash (using, for example, the hashing function used to form the pin) of the public key of the server included in the security certificate received from server 104. Client 102 may compare the hash formed from the public key in the security certificate to the pin, to check the authenticity of the security certificate (120), and thereby authenticate server 104 as trusted to communicate with client 102.

Clients that use resources or services over a network can expose a computer to a security threat (e.g., a MiTM attack to intercept information or compromise the security of the computer executing the client). Correspondingly, client application developers or computer system administrators, for example, may test the client to verify that the client accesses only trusted servers or trusted resources of trusted servers.

A system for testing a client application may include an analyzer and a scanner. An analyzer may cause the client to access network servers or resources of particular network servers (e.g., particular World-Wide Web, "WWW", pages). For example, an analyzer may simulate a human user of a mobile device app, or may access a human graphical user interface (GUI), a command line (CLI) interface, or an application-programming interface (API). The client may be embodied, in whole or in part, in a program and the program may include one or more of a GUI, a CLI, or an API. The GUI, CLI, or API may activate the client to perform a function. The client may be embodied, in whole or in part, in a hardware component, and the hardware component may provide interfaces to activate the client to perform a function. The analyzer may provide varying inputs to the client to cause the client to access various network-connected servers or resources of the servers.

In response to analyzer stimuli, the client may access a server using a network identifier for the server, such as a WWW Universal Resource Locator (URL) for a web page or service hosted on a server, or the Internet IP address of a server or resource of a server. A scanner may be inserted in the communications channel between the client and the network, or between the client and particular servers. A scanner may be inserted in the communications channel as a network "proxy" between the client and the network or servers.

A scanner may inspect, record, or access the server, and/or resource or services the client accesses, which may be referred to as "crawling" the client application "backend" (hereinafter, "crawling" refers to any operation of a scanner to inspect, record, or access servers, or resources or services of a server). Crawling the backend may determine the addresses or identities of servers, resources, or services to which a client directs a request. Crawling the backend may determine the content of information returned from a server, or the type or results of services performed or hosted on, or by, a server. A scanner may crawl the backend of a client application to detect security exposures or threats to, for example, the client, the client computer, or to a computing system, or components thereof, in communication with the client or the client computer. A scanner may simulate responses from the servers, and may forward actual or simulated responses to a client.

Figure 2:
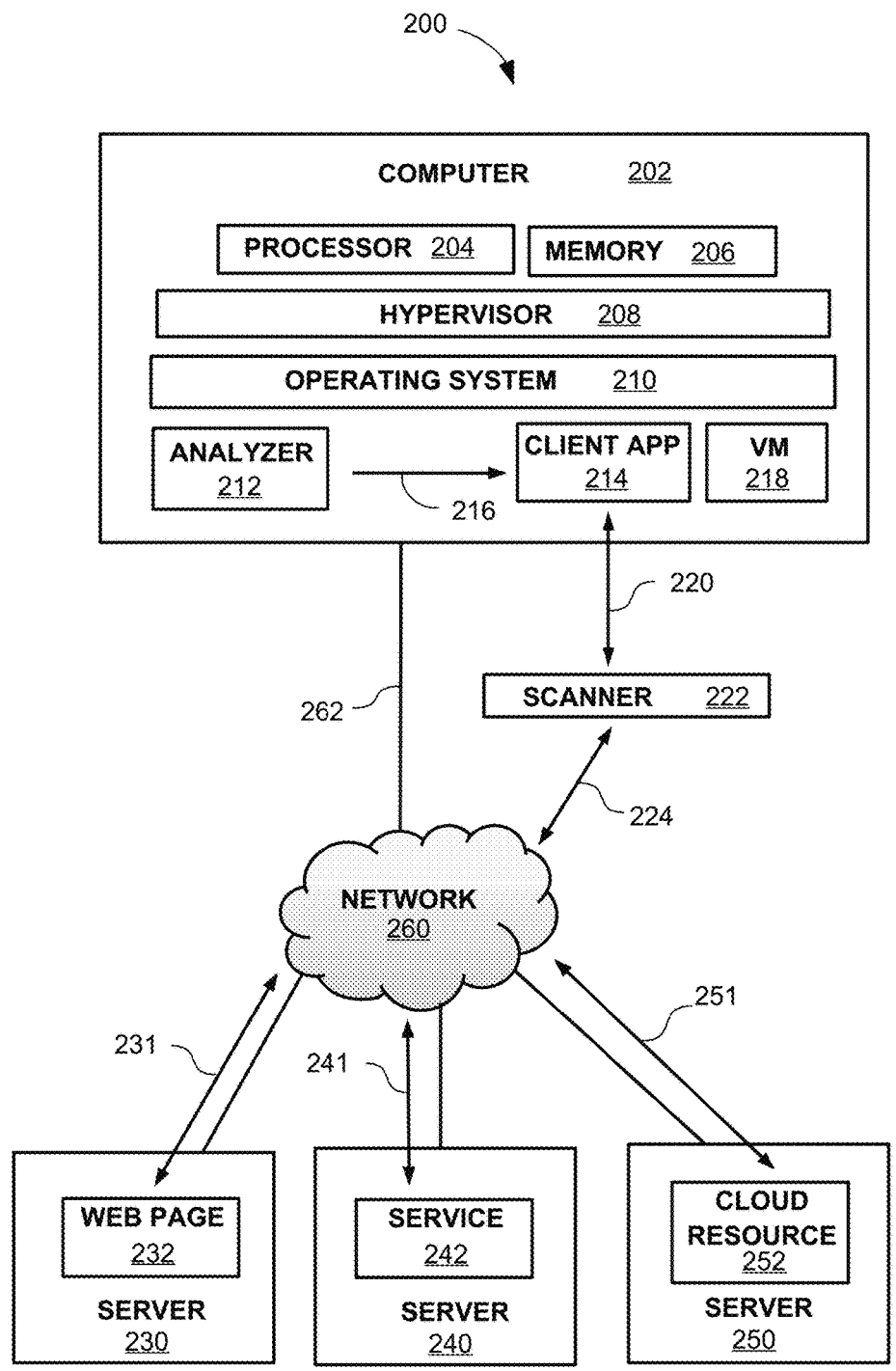
FIG. 2 is a block diagram illustrating an example computing system for authenticating a server, according to aspects of the disclosure.

FIG. 2 illustrates a computing system 200 in which a client application may access resources on network-connected servers, and an analyzer and scanner may operate to test the client for access to un-trusted or insecure (e.g., those that have security vulnerabilities or pose a security threat) servers or resources. FIG. 2 depicts computer 202 as connected 262 via a network 260 (e.g., the Internet or an intranet) to servers 230, 240, and 250. In some embodiments, computer 202 may be directly connected (not shown) to, or in communication with, one or more servers.

Computer 202 includes a processor 204 and a memory 206. A processor may be a single processor, a processor chip, a multi-core processor, a multi-threaded (e.g., SMT) processor, or any device capable of executing computing instructions. A computer may include a plurality of one or a variety of these types of processors. A memory may be a main memory, a cache memory, or a flash memory, for example. A computer may include a plurality of one or a variety of these types of memories.

In some embodiments, computer 202 may be a general or special purpose computer, a mobile device (e.g., a tablet computer or cell-phone), a wearable device (e.g., a fitness monitor), an internet-connected device (e.g., a device in the "Internet of Things"), a server computer, or any component of a computer, or computing system, capable of connecting to a network, such as the internet, and capable of hosting, or executing, a client application. In embodiments, a client application may use a processor, such as processor 204, and memory, such as memory 206, to execute programming instructions. In other embodiments a client application may be, or may include, a hardware component, and the hardware component may be included in a computing device in which the client application executes or operates within.

An operating system may host, or provide the environment for a client (e.g., an application program) to execute. An operating system may execute using hardware within a computer (e.g., processor 204 and memory 206 of computer 202) and a client may use the hardware within the computer under the control of the operating system. A computer may provide virtual machines, and the computer may include a hypervisor to facilitate providing virtual machines. A hypervisor may allocate to, and/or may control the use of, hardware and other resources (e.g., interrupt numbers) of the computer to an operating system.

For example, computer 202 includes a hypervisor 208, an operating system 210, and a virtual machine, VM 218. The hypervisor may allocate a processor, such as processor 204, and portions of memory 206 to operating system 210, which in turn may be used by a client application, such as client application 214, executing on, or operating within, computer 202. An operating system may execute within a VM. For example, an operating system (not shown) may execute within the environment of VM 218. Client 214 executes on, or operates within, computer 202 and may directly use the hardware or resources of the computer, or may use the hardware or resources under the control of operating system 210 (or, an operating system executing within VM 218).

Client 214 may use resources in servers—such as servers 230, 240, and 250—connected to network 260. For example, server 230 hosts web page 232; server 240 hosts a service 242 (e.g., financial transaction processing); and server 250 hosts cloud resource 252 (e.g., cloud storage or a VM). To access the resources or services, a client application may use a network address or identifier. For example, client 214 may know web page 232 or service 242 as a WWW URL (e.g., "www.service.com"—not intended herein to be any particular or actual WWW URL). Client 214 may know cloud resource by an IP address (e.g., 192.100.101.101—not intended herein to be the IP address of any particular or actual network entity).

A client application testing system may include analyzer 212, executing on or within computer 202, and a scanner 222. In an embodiment, an analyzer may execute on or within a computer in which a client executes, as illustrated by analyzer 212 within computer 202 in FIG. 3. Alternatively, (not shown) an analyzer may execute in a different computer in communication with a client (e.g., in a computer, such as a workstation or laptop, connected in some manner to the computer in which the client executes or operates).

In an embodiment, a scanner may be a component of a computer on, or within, which an analyzer executes, or may be a component of a computer on, or within, which a client executes. For example, scanner 222 may be a component of computer 202. In other embodiments, a scanner may be a component of a computer, or computing system, in communication with a client, or a computer in which a client executes or operates. For example, scanner 222 may be a component of a computer, or computing system, connected to computer 202, or in communication with client 214, by means of network 260. In embodiments, a scanner may be a program, may be a hardware component, or may be a combination of these. In some embodiments, an analyzer can be a function of, or included in, a scanner.

Analyzer 212 may access interfaces 216 (e.g., GUIs, CLIs, or APIs) of client 214 to activate a function of client 214. Activating the function may cause client 214 to access servers on network 260 (or, another network, not shown). For example, analyzer 212 may activate a function of client 214 that requests (231) web page 232 from server 230. Client 214 may identify web page 232 by a WWW URL, an IP address, or some other name or identity, and may identify server 230, for example, by an IP address. Analyzer 212 may activate a function of client 214 that requests (241) access to, or performance of, service 242. Client 214 may identify the service by a URL, an IP address, or some other name or identity, and may identify server 240, for example, by an IP address. Analyzer 212 may activate a function of client 214 that requests (251) access to cloud resource 252 in server 250. Client 214 may identify the cloud resource by a URL, an IP address, or some other name or identity, and may identify server 250, for example, by an IP address.

In embodiments, scanner 222 may operate as a proxy. Client 214 may know the IP address of scanner 222, and may communicate (220) with the scanner, acting as a proxy. Client 214 may receive communications from servers via scanner 222 acting as a proxy. Accordingly, scanner 222 may receive (220) communications from client 214 targeting servers, or server resources, on (e.g., servers 230, 240, or 250) or, in communication with (not shown), network 260, and may forward (224) these communications to the intended servers. The scanner may receive (e.g., 231, 241, or 251) responses, or other communications, from the servers and may forward these (220) to client 214. Scanner 222, acting as a proxy, may monitor the particular network addresses (e.g., URLs or IP addresses) the client targets.

An embodiment may employ secure communications for a client application to communicate with a server. For example, client 214 may communicate with servers 230, 240, or 250 using a TLS session. In operating as a proxy, a scanner then may be required to participate in the client establishing a TLS session with a server.

Figure 3:
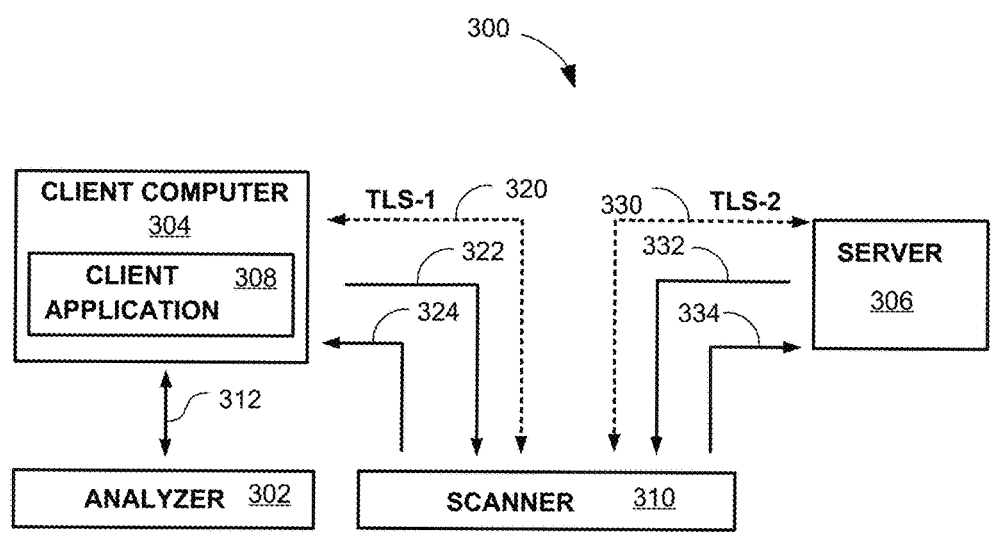
FIG. 3 is a flow diagram illustrating an example flow to establish secure communications including an analyzer and a scanner, according to aspects of the disclosure.

FIG. 3 illustrates an example flow 300 of a client application establishing a secure session (e.g., a TLS session) with a server in a system, such as system 200, that includes a scanner operating as a proxy between the client and the server. Client application 308 executes on client device 304. Client device 304 may be any of a variety of computers, or computing devices, such as previously disclosed; for example, client device 304 may be a mobile device, a tablet computer, a laptop, a server, or a VM operating within a computing device. Client 308 may access servers, such as server 306, directly or over a network, for example. Analyzer 302 may interact with client 308 to cause it to access the servers, or resources on the servers.

To access resources or servers, client 308 may use a secure communication session, such as a TLS session. Scanner 310 operates as a proxy between client 308 and a server, such as server 306. Accordingly, client 308 establishes TLS session TLS-1 (320) with the scanner 310. The scanner establishes TLS session TLS-2 (330) with server 306, which may be a target of client 308 communications to access server 306, or a resource hosted on server 306. Client 308 initiates (322) establishing the TLS-1 session and the scanner responds (324) to enable TLS-1 to be established. Client 308 may send a client hello and scanner 310 may send a server hello (both not shown) to establish TLS-1. Client 308 may request scanner 310 to provide a security certificate to establish the scanner as a trusted (proxy) server and to complete TLS-1 setup 320.

In establishing TLS-2 (330) with server 306, scanner 310 initiates (334) the session. Server 306 responds (332) to complete establishing TLS-2. Scanner 310 may send a client hello and server 306 may send a server hello (both not shown) to establish TLS-2. Scanner 310 may request server 306 to provide a security certificate. Scanner 310 and server 306, in establishing TLS-2, may determine a cipher, known privately between the scanner and server, for encrypting communications between them.

Analyzer 302 may interact (312) with client 308, and, in response, client 308 may send communications to access server 306, or resources or services hosted on server 306. For purposes of illustrating the disclosure, but not limiting the embodiments, the communications may be in the form of messages sent from client 308 to server 306, and vice-versa. The messages may be associated with accesses to resources or service hosted on server 306, and client 308 may encrypt messages targeting server 306 using the TLS-1 cipher. Client 308 may communicate the messages using the TLS-1 session and scanner 310 may receive the client 308 messages directed to server 306. Scanner 310 may decrypt the messages using the TLS-1 cipher and may record the resources or services targeted (e.g., an IP address or WWW URL) at server 306. Scanner 310 may communicate the messages from client 308 to server 306 using the TLS-2 session, and may use the TLS-2 cipher to encrypt the messages.

Server 306 may respond to the client 308 messages and send messages directed to client 308. The messages may return information from server 306 (e.g., the contents of a web page, or results of a transaction service) in response to the messages from client 308. Server 306 may communicate the messages to client 308 using the TLS-2 session, and may encrypt the messages using the TLS-2 cipher. Scanner 310 may receive the messages from server 306 and may decrypt the messages using the TLS-2 cipher. Scanner 310 may record information form server 306 regarding the resources in the client 308 messages. Scanner 310 may communicate the messages to client 308 using the TLS-1 session, and may use the TLS-1 cipher to encrypt the messages.

A client application may use certificate pinning, and the flow as illustrated in the example of FIG. 3, may not succeed in establishing a secure session between the client and a proxy (e.g., TLS-1 between client 308 and scanner 310). For example, client 308 may have a hash code (as an example of a pin) for the public key associated with server 306 and may embed that hash code in a module (or hardware component) included in or with client 308. Client 308, at 324, may receive a TLS session response (e.g., a server hello) that includes a security certificate. Correspondingly, client 308 may extract the public key from the security certificate, may form a hash code using that key, and may compare the hash code to the hash code embedded in the client code module (or hardware component). That is, client 308 may use certificate pinning to authenticate the security certificate received from scanner 310 in establishing TLS-1.

However, in establishing the TLS-1 session with client 308, scanner 310 may provide (in the response sent at 324) a security certificate associated with the scanner itself, acting as a proxy for servers accessed by client 308. Accordingly, the security certificate used to complete the TLS-1 session setup includes the public key associated with scanner 310. If client 308 forms a hash code from the scanner 310 public key, that hash code may not then match the hash code embedded in the client 308 code module. In response, client 308 may determine that scanner 310 is not an authentic, trusted server and may abandon communications with scanner 310. Consequently, using scanner 310 to intercept and inspect or modify communications with server 306, such as to crawl the backend of client 308, may not be possible in conventional systems.

To utilize a scanner (or, proxy) to crawl the backend of a client application, such as disclosed in the foregoing disclosures of FIG. 2 and FIG. 3, an analyzer may intercept operations of the client to extract authentication components from within a security certificate, such as a scanner security certificate provided to the client. The analyzer then may substitute authentication components from a security certificate associated with a server targeted by a client (e.g., to access a resource or service hosted by the server) in place of authentication components that otherwise might be extracted from a scanner certificate. The client (e.g., client 308), in receiving the authentication component extracted from the server security certificate, in substitution for the authentication component that may be otherwise extracted from the proxy security certificate, may then authenticate the proxy (e.g., scanner 310) as trusted.

Figure 4:
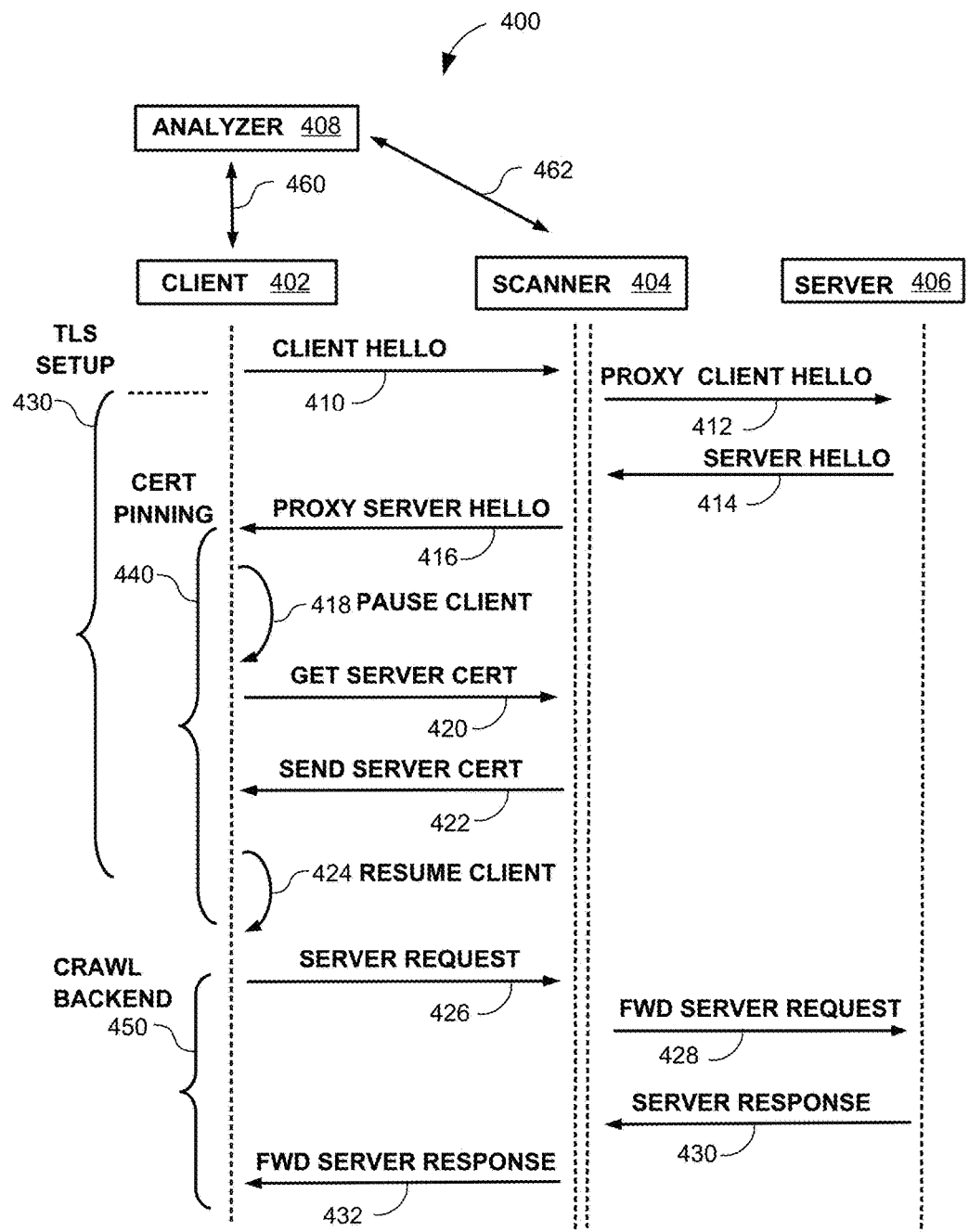
FIG. 4 is a flow diagram that illustrates an example flow to authenticate a server, according to aspects of the disclosure.

FIG. 4 illustrates an example communications flow 400 between a client application, a scanner, and a server such that the scanner is able to crawl client accesses to servers. Client 402 may access server 406 to perform a function. Client 402 may be an application executing on, or within, a computing device (e.g., a computer of a form such as previously disclosed herein). Client 402 (or, client computer 402) and servers, such as server 406, may be connected to a common network (e.g., an intranet or the Internet). In other embodiments client 402 (or, the client computer 402) may be connected directly (not shown) to one or more servers, such as server 406, or may be, in some other manner, in communication with client 402 (or, a computing device on, or within, which client 402 executes).

Client 402 may perform particular functions that request a service or a resource (e.g., a WWW page) from server 406. Scanner 404 acts as a proxy for client 402 accesses to one or more servers, such as server 406. Analyzer 408 interacts 460 with client 402 to activate client functions that access server 406. Analyzer 408 may access interfaces (e.g., GUIs, CLIs, or APIs, not shown) of client 402 to activate one or more functions that request to access server 406, or resources hosted by server 406.

In embodiments, analyzer 408 may be may be a program, may be a hardware component, or may be a combination thereof. Analyzer 408 may be included in a particular computer (e.g., a server) in communication with, or connected to a network that connects, client 402. In some embodiments, analyzer 408 may be included in client 402 computer. In embodiments scanner 404 may be a program, may be a hardware component, or may be a combination thereof. Scanner 404 may be a component of a computer (e.g., a server) in communication with, or connected to a network that connects, client 402 and server 406. In some embodiments, scanner 404 may be included in the client 402 computer.

Scanner 404 may crawl the client accesses to a server, or resources of a server, such as server 406. Analyzer 408 may interact 462 with scanner 404 to substitute a security certificate, received by scanner 404 from server 406, for a proxy (scanner 404) security certificate, provided by scanner 404 to client 402. In response to the substitution, client 402, performing certificate pinning, may then authenticate scanner 404 to establish a secure (e.g., TLS) session with scanner 404 and for communications between client 402 and server 406.

Scanner 404 may be included in the communications channel (or, path) between client 402 and server 406. Scanner 404 may intercept requests to access server 406, and may intercept responses from server 406 directed to client 402, and may forward the requests and responses to their intended recipient (e.g., client 402 or server 406). Scanner 404 may modify an intercepted request or response, or may generate, and may forward, a simulated response from server 406 to client 402.

For purposes of illustrating the disclosure, but not limiting the embodiments, client 402 initiates performing TLS setup 430 to establish a secure TLS session with scanner 404 acting as a proxy. Client 402 may initiate TLS setup 430, for example, to access server 406, or resources hosted by server 406. To initiate the TLS setup, client 402 may send (410) a client hello to scanner 404. Scanner 404, in response, sends (412) a proxy client hello to initiate a TLS session with server 406. In response, server 406 sends (414) a server hello to scanner 404. The proxy client hello may include a request to server 406 to provide a security certificate associated with server 406. Correspondingly, the server hello may include the requested security certificate and scanner 404 may retain a copy of the certificate.

Scanner 404 responds (416) to client 402 with a proxy server hello. For purposes of illustrating the disclosure, client 402 and scanner 404 exchange cryptographic information, and a proxy security certificate by means of a client and proxy (server) hello. Accordingly, client 402 includes in the client hello, sent at 410, cryptographic information to encrypt subsequent communications, and a request to provide a security certificate associated with scanner 404 (acting as a proxy). The scanner at 416 sends a proxy server hello, which includes cryptographic information and a proxy security certificate associated with scanner 404. In embodiments, a client and proxy may exchange cryptographic information, and/or a request for a security certificate and corresponding response including a security certificate, by means, or protocols other than a client and proxy hello. In some embodiments, a client and server may communicate without using encryption, and a client and server hello may omit cryptographic information to encrypt communications between them.

In performing TLS setup 430, client 402 performs certificate pinning 440. Correspondingly, client 402, at 418, may pass the security certificate received at 416 (from scanner 404) to an extraction function (not shown), to extract an authentication component to perform certificate pinning 440. An extraction component may be a program or may be a hardware component, and may be of the client application or the client computer. Alternatively, an extraction component may be a component of a computer, or computing device, in communication with the client 402 computer. An extraction component may be a service, and the client computer, or a component of a computing system (e.g., a server) in communication with the client or client computer, may provide the service.

Analyzer 408 may instrument, or "hook", various functions (e.g., function call APIs, hardware interfaces, or services) provided by the extraction component, such that when client 402 invokes a "hooked" function, the hook pauses, or suspends execution of the client and invokes a certificate substitution function (not shown). For example, an extraction component may provide a programming function call that client 402 invokes to extract an authentication component from a security certificate. Analyzer 408 may set, for example, a software trap, or exception call, on various function calls of the extraction component. The trap, or exception, may pause or suspend the client 402 execution when client 402 makes that particular function call, and may deliver execution to, or otherwise invoke, a certificate substitution function.

The certificate substitution function operates to substitute an authentication component from the server 406 security certificate (sent at 414 to scanner 404) for an authentication component being extracted by client 402 from a security certificate (e.g., the proxy security certificate). For purposes of the disclosure, but not limiting the embodiments, analyzer 408 may embody a certificate substitution function, or may interact with a certificate substitution function embodied in another component of the client computer, or a computer in communication with the client computer.

In performing certificate pinning 440, client 402, at 418, invokes the hooked extraction function to extract an authentication component from the proxy security certificate (received at 416). For example, client 402 may invoked the hooked function to extract the public key of the server from the proxy security certificate. Invoking the hooked function then pauses, at 418, the client execution and invokes analyzer 408. While the example method 400 includes hooking an extraction function to invoke certificate substitution, it would be evident to one of ordinary skill in the art that an embodiment can utilize other methods to detect a client application extracting an authentication component from a security certificate, and to pause execution of the client application to perform the features of the method.

In response to the hooked extraction function invoking the certificate substitution function, analyzer 408 sends (420) a request to scanner 404 to obtain the security certificate received at 414 from server 406. Scanner 404 then returns (422) the server 406 certificate to the analyzer. Analyzer 408 passes (not shown) to the extraction function (e.g., at 422 or 424), the server 406 security certificate, in substitution for the proxy security certificate that scanner 404 provided at 416 to client 402. The extraction function subsequently extracts the authentication component (e.g., the public key of the server) from the server 406 security certificate (received by scanner 404 at 414), in substitution for the proxy certificate sent to client 402 at 416.

Analyzer 408, at 424, resumes execution of client 402, passing the extracted server 406 authentication component to client 402. Client 402, at 424, completes certificate pinning 440 using the extracted server 406 authentication component. In performing certificate pinning 440 client 402 has, or knows, a trusted pin associated with the authentic server 406 security certificate. Client 402 forms a pin using the server 406 authentication component to compare with the trusted pin and, accordingly, authenticates scanner 404 as trusted and completes TLS setup 430.

The example TLS setup 430 may permit scanner 404 to subsequently receive, and decrypt, communications (e.g., messages) intended for server 406, and to receive, and encrypt, communications from server 406 (e.g., in response to communications scanner 404 may forward to server 406) intended for client 402. In this way, a scanner (or, proxy), such as scanner 404, may monitor the servers, or resources hosted by servers, accessed by a client application, such as client 402.

FIG. 4 illustrates client 402 performing TLS setup 430 and client pinning 440 with a single client, client 402, and a single server, server 406. However, it would be apparent to one of ordinary skill in the art that an embodiment may perform secure session setup (e.g., TLS setup 430) and client pinning (e.g., client pinning 440) with a plurality of clients and/or servers. Embodiments may perform secure session setup among one client and a plurality of servers, may perform secure session setup among a plurality of clients and a single server, or may perform secure session setup among the plurality of both clients and servers. Some embodiments may perform secure session setup serially, involving, for example, one particular client and one particular server at a time. Other embodiments may perform secure session setup concurrently among the plurality of clients and/or servers. Accordingly, in an embodiment an analyzer may detect (e.g., as part of certificate pinning 440), at any particular time, any of a variety of client applications extracting an authentication component from the same security certificate, or from any of a variety of security certificates, associated with one or more of the various servers involved in secure session setup and/or certificate pinning.

In response to authenticating scanner 404 as a trusted server (for example, by means of certificate pinning 440 using the server 406 security certificate) client 402 may access resources and services hosted on, or by, server 406. Scanner 404 may receive requests from client 402 directed at server 406, and receive responses from server 406 directed to client 402. This permits scanner 406 to crawl the backend (450) of the client 402.

Crawling the backend (450) of client 402 may comprise client 402 sending, or otherwise communicating, at 426, a server request directed at, or to, server 406 or a resource or service hosted by server 406. The request may include a request access to a resource or service provided on or by server 406. Scanner 404 receives (426) the server request and may inspect the contents of the request, such as to which server (and/or which resource or service on the server) client 402 has directed the request. The scanner may, at 428, forward the client request to server 406. Alternatively, scanner 404 may discard the request and, at 432, may send a simulated server response. A simulated server response may indicate that the requested server, resource, or service was unavailable, or not found.

Subsequent to 428, server 406 processes the request and, at 430, may return a response. Scanner 404 (at 430) may inspect the contents of the server response. The response may include a resource, such as a web page, or set of web pages, or may include the results of processing a service request. The response may include a request that client 402 provide (not shown) additional information to the server. For example, the response may include a request that client 402 send a user ID and password to server 406 to access a resource or service. The response may include data from the server, and the data may be, or be subject, to malware or another security vulnerability.

Scanner 404, at 432, may forward the server response to client 402. Alternatively, if the scanner determines that the server response at 428 presents a security threat, the scanner may determine not to forward (not shown) the server response to the client. Alternatively, scanner 404 (at 430) may inspect and/or discard the server response and, at 432, may send a simulated server response. A simulated server response may indicate that the requested server, resource, or service was unavailable, or not found.

In some embodiments, a scanner (or, proxy) may crawl a client application backend and may "masquerade" as a server. The scanner (or, proxy) may intercept a server request from a client, may inspect the request, and may send a response to the client. For example scanner 404, crawling the backend (450) of client 402, may receive the server request at 426. Scanner 404 may omit, at 428, forwarding the request to server 406, and, correspondingly, may omit, at 432, forwarding to client 402 a server response received at 430. Instead, scanner 404 may inspect the request received at 426, for example, to determine the web page address client 402 targeted. Scanner 404 subsequently, and possibly separately or independently of crawling the backend (450) of client 402, may access the requested web page and inspect it (and, possibly, other web pages or hyperlinks associated with that web page).

Scanner 404 may generate a response, masquerading as server 406; for example, scanner 404 may generate and send a response, at 432, indicating (for example) "page not found". Alternatively, scanner 404 may, in response to receiving a server request, at 426, forward the server request and receive a server response, 428 and 430, and may, at 432, omit forwarding the server response and, instead, generate and send a different response (e.g., "page not found") to client 402.

In an embodiment, a scanner (or, proxy) may not have or make a connection to a server, or may omit communicating with a server. Accordingly, a scanner (or, proxy) may determine (or, know) a server security certificate by some means other than communications with a server. For example, scanner 404 may not have or, may omit making, a connection to server 406. Scanner 404 may omit exchanging the proxy client hello (412) and server hello (414) with server 406. Accordingly, scanner 404 may know or obtain a security certificate for server 404 by some other means. For example, scanner 404 may perform the hello exchange, 412 and 414, at some other time, separate or independent of TLS setup 430, and retain the server 406 security certificate. Alternatively, scanner 404 may perform a proxy client and server hello exchange, and may receive a security certificate from server 404, as illustrated in TLS setup 430. It would be apparent to one of ordinary skill in the art that there are a variety of methods by which a scanner (or, proxy) may obtain, or be supplied with, a security certificate for a server and, accordingly, omit exchanging a proxy client or server hello, or equivalents thereof, to obtain a server security certificate.

FIG. 4 illustrates crawling the backend involving a single server request (426) and server response (430). However, it would be apparent to one of ordinary skill in the art that an embodiment may repeat 426, 428, 430, and 432 an arbitrary number of times in crawling the backend of the same or various other functions of a client application, such as client 402. It may be, for example, an objective of an analyzer, such as 408, to induce or cause the client to attempt to access various or, all possible, servers, resources, or services the client may be capable, designed, or intended, to access. It may be another objective of an analyzer to induce or cause the client to attempt to access servers, resources, or services beyond those for which the client is designed or intended.

FIG. 4 illustrates scanner 404 crawling the backend (450) of only one client, client 402. However, it would be apparent to one of ordinary skill in the art that an embodiment may crawl the backend of a plurality of clients. Some embodiments may crawl the backend of clients serially, involving, for example, one particular client at a time. Other embodiments may crawl the backend of a plurality of clients concurrently. It would be apparent to one of ordinary skill in the art that an embodiment may crawl the backend of a plurality of clients in any particular order or degree of concurrency, and is not limited by the examples of FIG. 4.

FIG. 4 illustrates various aspects of the disclosure authenticating a server in the context of testing a client application and crawling a client application backend. However, the disclosure of FIG. 4 does not intend to limit the features of the disclosure to testing a client application, crawling a client application backend, or other, particular uses or purposes of a proxy (such as scanning). Rather, the scope of the disclosure encompasses, and it would be within the skill of one of ordinary skill in the art to apply the disclosure to, any of a variety of embodiments that include a client authenticating a proxy to receive communications between the client and an authenticated server.

Figure 5:
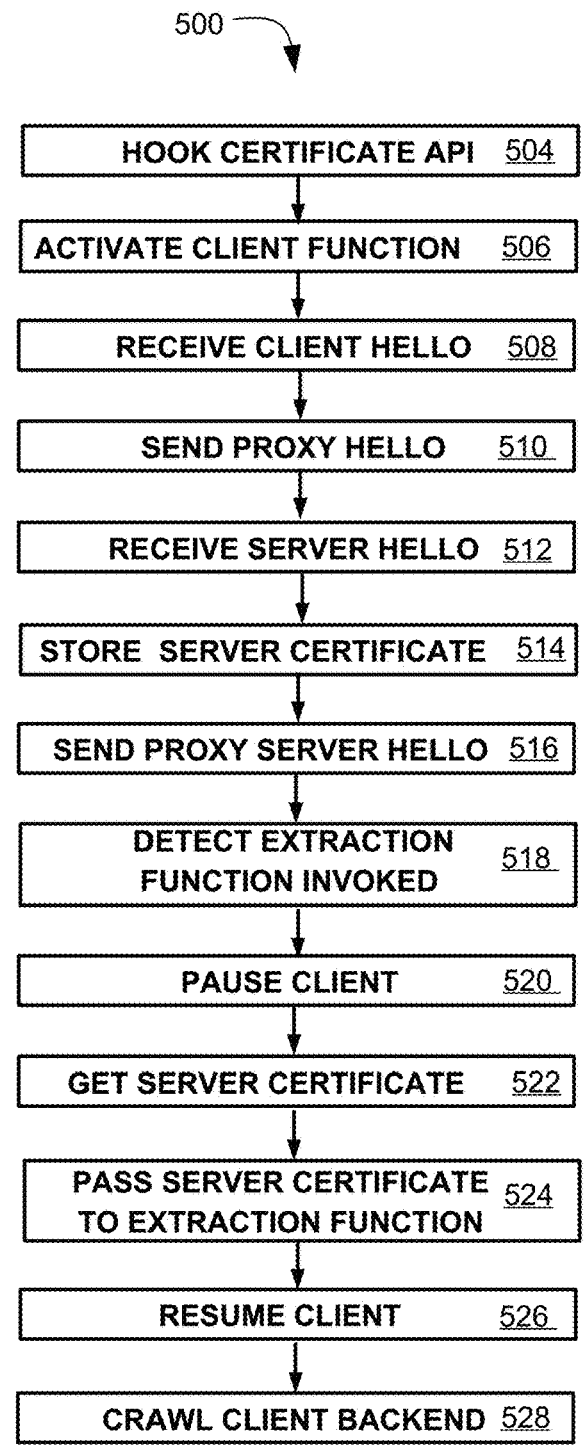
FIG. 5 is a flowchart that illustrates an example method to authenticate a server, according to aspects of the disclosure.

FIG. 5 illustrates an example method 500 for authenticating a server, in which a client application uses certificate pinning and a proxy is in the communication path between the client and the server. For purposes of illustrating the method, but not limiting the embodiments, the disclosure describes the method as performed by an application test platform. In an embodiment the test platform may be a program, may be a hardware element, or may be a combination thereof, and may execute (or operate) in or on a client computer of an application-under-test (hereinafter, "client"). In some embodiments, the test platform, or components thereof, may execute in or on one or more computers, or computing devices, in communication with a client computer.

The disclosure describes the test platform as including an analyzer component and a scanner component. The analyzer may interact with the client, or the client computer, to cause the client to access one or more servers or resources hosted by servers in communication with the client computer (e.g., connected by an intranet or the Internet, or, directly connected, to the client or the client computer). The scanner component may be inserted in a communications channel between the client, or the client computer, and the server(s). The scanner may act as a proxy server to forward client accesses to the servers.

The analyzer and the scanner components may be included in a program executing on the same computer, or computing device or system, or may be included in programs executing on different computers, computing devices, or computing systems. In some embodiments the test platform, or the analyzer or scanner, or other functions or components of the test platform, may be, wholly or in part, hardware components of a computer, computing device, or computing system. However, it would be apparent to one of ordinary skill in the art that an embodiment may include other components, or functions, in addition to, or in place of, an analyzer and/or a scanner.

Also, for purposes of illustrating the method, the client is described as establishing a TLS secure session with the scanner, and the scanner establishing TLS secure session with the server. However, it would be apparent to one of ordinary skill in the art that an embodiment may perform other methods of establishing a secure session between clients, proxies, and servers. It would be further apparent to one of ordinary skill in the art that the example method 500, or aspects or features thereof, may be applied to any of a variety of embodiments in which a client application uses certificate pinning to authenticate a server.

The disclosure describes the client computer as having, or being in communication with a computer or server having, a certificate extraction function operating to extract authentication component information from a security certificate. For example, a client may invoke a certificate extraction function to extract a public key from a security certificate. The client may invoke the extraction function by means of a certificate API, and the API may be amenable to the test platform detecting the client invoking the extraction function. For example, the test platform may be able to instrument, or hook, (e.g., set a software trap or exception within) an extraction function of the API.

However, it would be apparent to one of ordinary skill in the art that a client application may use a variety of components, or functions, of a computing device or computing system to extract authentication components from a security certificate. It would be further apparent to one of ordinary skill in the art that a test platform may have corresponding other means to detect the client invoking another type of component, or function, to extract authentication components from a security certificate, and to perform features of the method.

Referring to FIG. 5, at 504, the test platform hooks one or more extraction functions of the certificate API. At 506, the analyzer activates a function of the client. The analyzer may access an interface to a function of the client, such as an interface (e.g., an input field, a command, or a function call) included in a client GUI, CLI, or other AP, to activate the function. Activating the client function, at 506, may cause the client to access a server, or a resource hosted by a server (e.g., a web page or service). Further, the client accessing the server or resource may cause the client to initiate establishing a TLS secure session with the scanner (operating as a proxy).

Accordingly, at 508 the scanner receives a communication from the client—for example, a client hello—to initiate the TLS secure session. The client hello may include the identity (e.g., an IP address or a WWW URL) of the server, or of a resource or service hosted on, or by, the server. The client hello includes a request to provide a security certificate associated with the server. Correspondingly, at 510 the scanner initiates establishing a TLS secure session with the server targeted by the client hello. At 510, the scanner sends a proxy hello to the target server and includes, in the proxy hello, information to initiate establishing the TLS session with the server. The proxy hello includes a request for the server to provide the scanner with a security certificate associated with the server. Correspondingly, at 512, the scanner receives, from the server, a server hello and the server hello includes the server security certificate requested by the scanner at 510 and, at 514, the scanner stores the server certificate.

To complete establishing the TLS session with the client, at 516 the scanner responds to the client hello (from 508) with proxy server hello, which includes cryptographic information and a security certificate associated with the scanner (as a proxy). The client utilizes certificate pinning to authenticate the scanner as a trusted server. The client passes the proxy server certificate, received at 516, to the extraction function, to extract an authentication component, such as the public key of the server, from the proxy security certificate and to form a pin to compare with a trusted pin associated with the server.

In some embodiments, a proxy may not have, or may omit making, a connection to a server, or may not exchange a proxy and server hello, and, correspondingly, may omit 510 and 512. Accordingly, a proxy (e.g., the scanner) may know, or may obtain, a server security certificate by another means. For example, a proxy may make a connection to a server and may perform 510 and 512 separately from, or independently of, method 500. In an embodiment, another component of a test platform (e.g., a human user, or a program, testing an application), or a computing system, may supply a proxy with a server security certificate. It would be apparent to one of ordinary skill in the art that there are a variety of methods by which a proxy may obtain, or be supplied with, a security certificate for a server and, accordingly, omit 510 and 512.

At 518, the client accessing the hooked extraction function invokes the analyzer (as embodying the certificate substitution function). Accordingly, at 520 the analyzer (or, for example, the hook that invoked the analyzer, such as a trap or exception) pauses execution (or, operation) of the client. At 522, the analyzer communicates with the scanner to retrieve the server security certificate and, at 524, the analyzer passes the server security certificate to the extraction function, in substitution for the proxy security certificate passed, at 518, from the client to the extraction function.

The analyzer (or, a proxy) retrieving the server security certificate, at 522, may involve various communications between the analyzer and the scanner. For example, the analyzer may send a message to the scanner requesting the server certificate. The analyzer may send the message utilizing a communications channel established between the client (e.g., a TCP session such as disclosed in reference to FIG. 1), or utilizing another, alternative communications channel. The analyzer may send the message utilizing a secure communications session established between the client and scanner at 508 through 516. The scanner may respond and return the server security certificate using the communications method used by the analyzer to request the certificate.

In other embodiments, the analyzer and scanner may be components of a program, or included in components of the client computing device, and the analyzer may have an API to invoke a function (e.g., a programming function call) of the scanner, from which the scanner may return the server security certificate as a return argument or parameter. In yet other embodiments, the analyzer may have direct access (e.g., to storage used by the scanner) to the server security certificate. It would be apparent to one of ordinary skill in the art that there are a variety of methods by which an analyzer, or another function of a computer or computing system, may retrieve a server security certificate in order to pass the certificate, at 524, to the extraction function.

At 524, the analyzer passes the server certificate, received at 522, to the extraction function, and at 526, resumes the client execution. Upon resuming execution (or, operation), the extraction function returns the results of the function invoked at 518 to the client. Resuming execution of the client may be a function of the analyzer, or may be a function of the manner in which the client invoking the API function was, at 516, detected and the analyzer invoked. For example, the detection may have been by means of a software trap or exception, and the program that handles the trap or exception may resume execution of the client at 526. It would be apparent to one of ordinary skill in the art that a variety of functions of a test platform, or a computing system (or, an operating system executing a client application or function of a test platform, for example) may resume execution of the client. Resuming execution (or, operation) of the client may be in accordance with the means by which, at 518, the test platform, or computing system, paused client execution.

At 528, in resuming operations, the client forms a pin using the authentication component extracted at 524 from the server security certificate, compares the pin to a trusted pin associated with the server, authenticates the scanner (or, a proxy) as trusted, and completes establishing the TLS session. Having established the TLS secure session between the client and the scanner, the analyzer interacts (at 528) with the client to activate client functions that access the server, or resources or services hosted on or by the server. As the client requests access and the server responds to the requests, the scanner crawls (at 528) the backend of the client.

As disclosed in reference to FIG. 4 regarding crawling the backend (450) of a client application, it would be apparent to one of ordinary skill in the art that method 500 may involve a plurality of clients and/or servers. It would further be apparent to one of ordinary skill in the art that an embodiment may perform method 500, or elements thereof, in any particular order or degree of concurrency, with respect to the plurality of the clients and/or the servers, and interaction of an analyzer with a plurality of clients.

Figure 6:
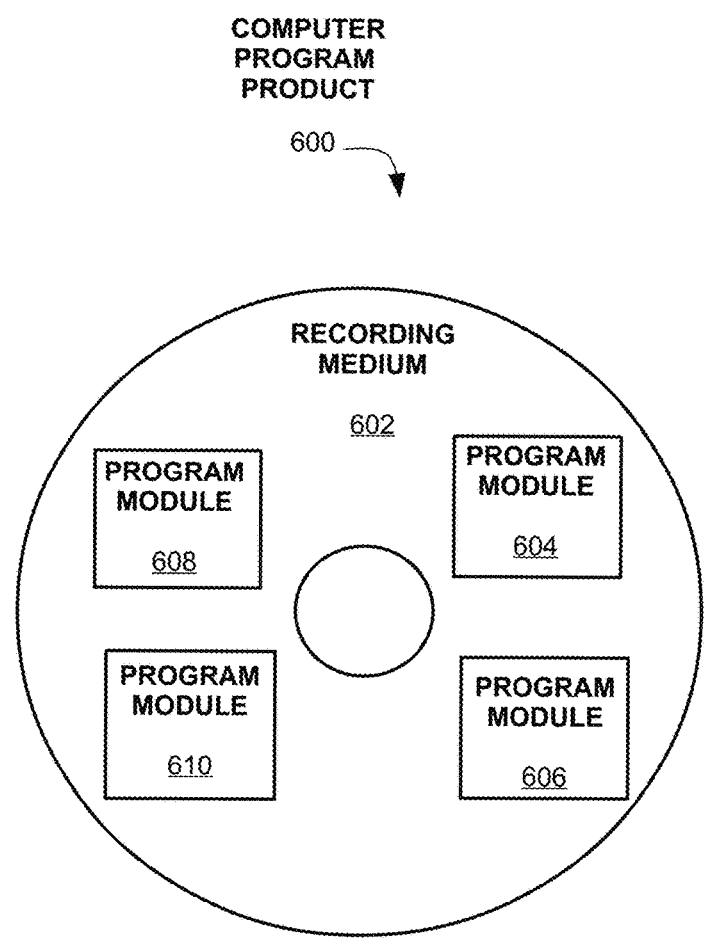
FIG. 6 is a block diagram illustrating a computer program product that may embody methods and structures of the disclosure.

The structures and methods of the disclosure are amenable to embodiment in an article of manufacture or computer program product. FIG. 6 depicts an article of manufacture or computer program product 600 that is one example embodiment of the invention. The computer program product 600 may include a recording medium 602, and the recording medium 602 may store program modules 604, 606, 608, and 610 for a computer to carry out the aspects of the invention. The recording medium 602 may be a CD ROM, DVD, tape, diskette, non-volatile or flash memory, storage medium accessed by a network connection, or other similar computer readable medium for containing a program product.

A sequence of program instructions within, or an assembly of one or more interrelated modules defined by, the program modules 604, 606, 608, and 610 may direct a computer to implement the aspects of the invention including, but not limited to, the structures and operations illustrated in and described in the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may connect to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for authenticating a server, the computer program product comprising:

one or more computer-readable storage medium and program instructions stored on at least one of the one or more tangible storage medium, the program instructions executable by a processor to perform a method comprising:

receiving, from a client, a client request for a security certificate, the client communicatively coupled to a hosting server;

communicating, by a computer, to the client, in response to the request for the security certificate, a proxy security certificate, the proxy security certificate associated with a proxy, the proxy security certificate including a first server authentication component, the proxy interposed in the communication path between the client and the hosting server, the proxy receiving a client communication, the client communication directed to the hosting server, based, at least in part, on an extracted second server authentication component authenticating the proxy to receive client communications directed to the hosting server, the proxy receiving the client communication is associated with activating a function of the client, the function producing the client communication directed to the hosting server, scanning the client communication for the identity of at least one of a resource or a service, the at least one of the resource or the service hosted on at least one of the hosting server or a computing system in communication with the hosting server, the proxy obtaining the hosting server security certificate from the hosting server;

detecting the client extracting the first server authentication component from the proxy security certificate by instrumenting an extraction function, the extraction function operative to extract the first server authentication component from the proxy server security certificate, the instrumenting operative to detect the client accessing the extraction function;

pausing operation of the client in response to the detecting the client extracting the first server authentication component;

extracting the second server authentication component from a hosting server security certificate, the hosting security certificate associated with the hosting server;

resuming operation of the client, wherein resuming operation of the client includes the client completing the extracting the first server authentication component from the proxy security certificate using the extracted second server authentication component in substitution for the first server authentication component, the extracted second server authentication component, in substitution for the first server authentication component, operating to authenticate the proxy to receive client communications directed to the hosting server;

wherein the client extracting the first server authentication component from the proxy security certificate is based, at least in part, on the client performing certificate pinning authentication of the hosting server;

wherein using the extracted second server authentication component, in substitution for the first server authentication component, satisfies the certificate pinning authentication; and monitoring a backend of the client to determine identities of servers to which the client directs the request.

* * * * *